Sept. 29, 1959 A. M. LEVINE 2,906,829
MEANS REDUCING NOISE EFFECTS IN TELEVISION RECEIVERS
Filed Dec. 9, 1954
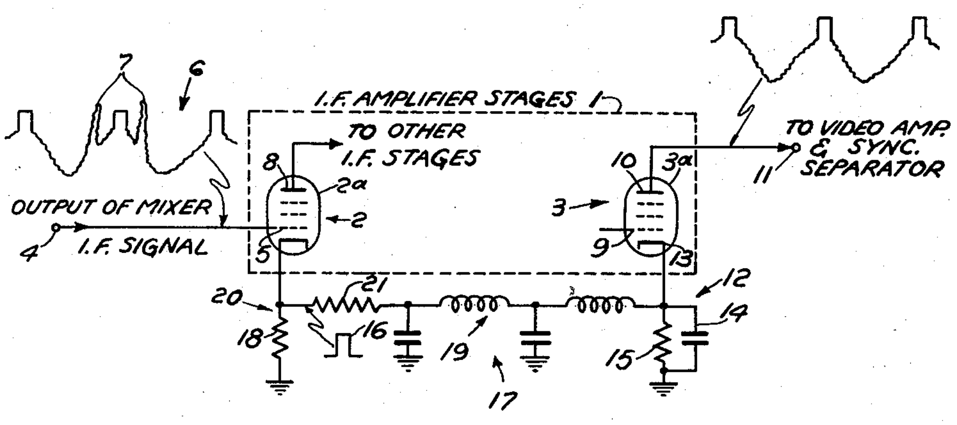
INVENTOR
ARNOLD M. LEVINE
BY
ATTORNEY United States Patent Office 2,906,829

Patented Sept. 29, 1959

2,906,829

MEANS REDUCING NOISE EFFECTS IN TELEVISION RECEIVERS

Arnold M. Levine, River Edge, N.J., assignor to International Telephone and Telegraph Corporation, Nutley, N.J., a corporation of Maryland Application December 9, 1954, Serial No. 474,223

5 Claims. (Cl. 179—171)

This invention relates to television receivers and more particularly to means for substantially reducing the effect of noise which may be present in the signal circuit of such receivers and the like.

There are two troublesome effects of noise on a television picture which are further exaggerated when a signal is being received in the so-called fringe areas. The first and most obvious effect is that the noise components appear at the detector more or less superimposed on the modulation envelope which will produce in the received picture a pattern of small random dots and flashes. The second effect, even with quite elaborate synchronizing pulse separating circuits, is the irregularity of initiating the line time base generator. This is caused by a noise pulse to which the synchronizing circuits may lock and thereby cause a jumpy picture.

It has been the practice in the past to employ circuitry associated with the output of the video amplifier of the television receiver, either in conjuction with or just prior to the synchronizing pulse separating circuit, which includes at least one additional electron tube and its associated circuitry or a number of such electron tubes. The added circuits function to reduce or cancel the noise pulses for protection of the synchronizing circuits of the television receiver. However, due to their location in the receiver circuitry, that is, following the output of the video amplifier and just prior to the cathode ray picture tube, the randomly occurring spots seen on the viewing screen caused by the noise pulses are not successfully reduced.

One of the objects of the present invention, therefore, is to provide a relatively simple and inexpensive means for reducing the effect of noise which may be present in the video signal received by a television receiver.

A further object of the present invention is to provide a simple circuit in operable association with the intermediate frequency (IF) section of a television receiver. The presence of a noise pulse containing frequencies lower than the IF band of the video signal will be detected by the circuit of this invention and a control voltage will be produced for coupling from one of the last IF stages to a previous IF stage to effectively reduce the amplification of the noise pulse and thereby substantially reduce to an insignificant amount the undesired effects of the noise pulses.

A feature of this invention is a frequency responsive circuit disposed in the cathode circuit of one of a plurality of IF stages which effectively appears as a very low impedance to the intermediate frequency of the television receiver and as a relatively high impedance to the lower frequencies of the noise pulses such that a control pulse is produced therein in the presence of a noise pulse. A feedback path is provided from said frequency responsive circuit to a preceding IF stage for coupling the produced control pulse thereto to reduce the amplification of the noise pulse and thereby substantially reduce the undesired effect of noise pulses.

The above-mentioned and other features and objects of this invention will become more apparent by reference to the following description taken in conjunction with the accompanying drawing, the single figure of which illustrates schematically an embodiment of my invention.

With reference to the figure there is illustrated diagrammatically a plurality of IF amplifier stages 1 as is normally employed in television receivers. The first and last IF stages 2 and 3 are represented as including electron discharge devices 2a and 3a, respectively, the circuitry thereof being omitted for purposes of clarity and since the known circuitry thereof can be readily supplied by those skilled in the art and from the volumes of prior art.

The output of the mixer stage of the usual television receiver is shown to be coupled to terminal 4 for introduction on the control grid 5 of the IF stage 2. The IF signal envelope coupled to stage 2 is illustrated in curve 6 which may include therein the troublesome noise pulses 7. The signal coupled to grid 5 of stage 2 is coupled from the anode 8 thereof through succeeding IF stages to the control grid 9 of the IF stage 3 and hence from the anode 10 thereof to the video amplifier and sync separator circuit by means of terminal 11.

The description thus far has been concerned with conventional circuitry as is commonly employed in television receivers to provide the conversion of a carrier signal to an IF signal, amplification of the IF signal, and hence the necessary amplification and sync separation performed on the amplified output of amplifier stages 1. If no provisions are made to compensate for noise pulses in the television receiver, the noise pulses 7 of curve 6 will be amplified along with the video signal in stages 1 and may very well be separated with the normal synchronizing pulses and in certain instances will randomly initiate or trigger the synchronizing generators. As pointed out hereinabove, the prior art noise limiting circuits have incorporated additional electron discharge devices and in some instances special and expensive electron discharge devices for operation on the output of stages 1 to prevent the noise pulses from initiating the operation of the synchronizing timing generators.

It is the purpose of this invention to operate on the IF signal to substantially reduce the amplitude of a noise pulse or pulses which occur in the video signal, such as indicated by pulses 7, to prevent false initiation of the synchronizing timing generator and further to remove the randomly occurring dots that appear on the viewing screen of a television receiver. To accomplish this, there is provided a frequency responsive circuit 12 disposed in the cathode circuit of the electron discharge device 3a included in the IF stage 3. As disclosed in the drawing, this frequency responsive circuit 12 is coupled between the cathode 13 of device 3a and a reference potential, herein illustrated as being ground, but, of course, not necessarily limited thereto. The frequency responsive circuit 12 includes as components thereof condenser 14 and resistance 15 disposed in shunt relationship which have an impedance characteristic such that a very low impedance is presented to the intermediate frequency signal and a relatively high impedance is presented to the frequency components of a noise pulse lower than the frequency of the IF frequency. The parallel combination of condenser 14 and resistance 15 will effectively short-circuit the IF signal impressed thereon while a noise pulse will produce a control pulse 16 of sufficient amplitude to control the amplification of a preceding IF stage.

A feedback path 17 is provided from the junction of cathode 13 and the parallel circuit of condenser 14 and resistor 15 to a cathode resistance 18 of a preceding IF stage, illustrated herein to be stage 2 of amplifier stages 1.

However, the feedback path may couple the control pulse from frequency responsive circuit 12 to any one of the preceding amplifier stages, but preferably, is coupled to the first or second one of the IF amplifier stages such that the amplitude of the noise pulse will not be greatly amplified by the operation of preceding uncontrolled IF amplifier stages.

The feedback path 17 is shown to comprise an LC filter circuit 19 which has a response characteristic to enable the attenuation of intermediate frequency signals that may be impressed thereon to prevent the coupling of intermediate frequency from the later occurring IF amplifier stages to a preceding amplifier stage. The response characteristic of filter 19 likewise is such as to pass without appreciably attenuating the control pulse 16. The amplitude of pulse 16 may be controlled by employment of the proper value of resistors forming the voltage divider 20. The resistors of divider 20 are illustrated as including cathode resistor 18 and resistance 21 which couples filter 19 to the junction of resistor 18 and the cathode of electron discharge device 2*a*.

In a reduction to practice of the embodiment herein disclosed for incorporation in a television receiver having a 40 mc. IF, it has been found that a value of 0.001 microfarad for condenser 14 and a value of 150 ohms for resistor 15 provides a satisfactory frequency responsive circuit 12 to behave as a very low impedance in the presence of normal 40 mc. IF signals and as a relatively high impedance in the presence of relatively large positive noise pulses having frequency components lower than the 40 mc. IF signal to develop the control pulse 16 of sufficient amplitude and polarity to control the amplification of the noise pulse in previous IF amplifier stages. This reduction to practice was shown to protect the synchronizing circuits from random false initiation by noise pulses and substantially reduced to an insignificant value the presence of spots and flashes on the viewing screen. As can be seen in the drawing and description of this invention, the reduction of the effect of noise in television receivers is accomplished by incorporating in operable association with the IF amplifier stages 1 an inexpensive circuit arrangement which will not appreciably add to the cost of a television receiver having no noise protection and yet will provide a more desirable picture for viewing.

If the noise reducing circuit of this invention is incorporated in an intercarrier sound television receiver, there will also be included the reduction of unwanted effects of noise pulses upon the quality of the audio signal. Furthermore, it will be obvious from this that the incorporation of the noise reducing circuit of this invention on the sound IF stages of certain television receivers not employing an intercarrier sound system will likewise appreciably reduce the unwanted effects of noise pulses upon the quality of the audio signal.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a television receiver for receiving composite video signals, a plurality of intermediate frequency amplifier stages, each of said stages including a reference potential, an electron discharge device having at least an anode, a cathode and a control grid, a composite video signal input means coupled to said control grid and a composite video signal output means coupled to said anode, said composite viedo signal following a signal path through said plurality of stages from said signal input means of the first of said stages to said signal output means of the last of said stages including said signal input means and said signal output means of each of said stages, a parallel frequency responsive circuit coupled between the cathode of one of said stages succeeding the first of said stages and said reference potential, said parallel circuit presenting a relatively low impedance to the intermediate frequency of said video signals and a relatively high impedance to the lower frequencies of a noise pulse and a feedback path coupling only said lower frequencies of a noise pulse when a noise pulse is present in said video signals from said one stage to another of said stages preceding said one stage to reduce the amplification of said noise pulse and thereby substantially reduce the undesired effects of noise pulses.

2. In a television receiver for receiving composite video signals, a plurality of intermediate frequency amplifier stages, each of said stages including a reference potential, an electron discharge device having at least an anode, a cathode and a control grid, a composite video signal input means coupled to said control grid and a composite video signal output means coupled to said anode, said composite video signal following a signal path through said plurality of stages from said signal input means of the first of said stages to said signal output means of the last of said stages including said signal input means and said signal output means of each of said stages, a parallel frequency responsive circuit coupled between the cathode of one of said stages succeeding the first of said stages and said reference potential, said parallel circuit presenting a relatively low impedance to the intermediate frequency of said video signals and a relatively high impedance to the lower frequencies of a noise pulse and a feedback path coupling only said lower frequencies of a noise pulse when a noise pulse is present in said video signals from said parallel circuit to the cathode of another of said stages preceding said one of said stages to reduce the amplification of said noise pulse and thereby substantially eliminate the undesired effects of noise pulses, said feedback path including a signal filter circuit having a response characteristic which attenuates said intermediate frequency signals and passes said lower frequencies of a noise pulse substantially without attenuation.

3. In a television receiver for receiving composite video signals, a plurality of intermediate frequency amplifier stages, each of said stages including a reference potential, an electron discharge device having at least an anode, a cathode and a control grid, a composite viedo signal input means coupled to said control grid and a compcsite video signal output means coupled to said anode, said composite video signal following a signal path through said plurality of stages from said signal input means of the first of said stages to said signal output means of the last of said stages including said signal input means and said signal output means of each of said stages, a resistor and a capacitor each coupled between the cathode of one of said stages succeeding the first of said stages and said reference potential, said resistor and capacitor providing a parallel frequency responsive circuit which presents an effective short circuit to the intermediate frequency of said video signals and a relatively high impedance to the lower frequencies of a noise pulse, and a feedback path including an inductive-capacitive filter circuit coupling only said lower frequencies of a noise pulse when a noise pulse is present in said video signals from the junction of the cathode of said one of said stages and said resistor and capacitor to the cathode of another of said stages preceding said one of said stages to reduce the amplification of said noise pulse and thereby substantially eliminate the undesired effects of noise pulses, said filter circuit having a response characteristic which passes said lower frequencies of a noise pulse substantially without attenuation and effectively attenuates said intermediate frequency signal.

4. In a television receiver for receiving composite video signals, a plurality of intermediate frequency amplifier stages, each of said stages including a reference potential, an electron discharge device having at least an anode, a cathode and a control grid, a composite video signal input means coupled to said control grid and a composite video signal output means coupled to said anode, said composite video signal following a signal path through said plurality of stages from said signal input means of the first of said stages to said signal output means of the last of said stages including said signal input means and said signal output means of each of said stages, a frequency responsive circuit coupled between the cathode of one of said stages succeeding the first of said stages and said reference potential, said frequency responsive circuit presenting a relatively low impedance to the intermediate frequency of said video signals and a relatively high impedance to the lower frequencies of a noise pulse and a feedback circuit coupling only said lower frequencies of a noise pulse when a noise pulse is present in said video signals from said one stage to the cathode of another of said stages preceding said one stage to reduce the amplification of said noise pulse and thereby substantially reduce the undesired effects of noise pulses.

5. In a television receiver for receiving composite video signals, a plurality of intermediate frequency amplifier stages, each of said stages including a reference potential, an electron discharge device having at least an anode, a cathode and a control grid, a composite video signal input means coupled to said control grid and a composite video signal output means coupled to said anode, said composite video signal following a signal path through said plurality of stages from said signal input means of the first of said stages to said signal output means of the last of said stages including said signal input means and said signal output means of each of said stages, a frequency responsive circuit coupled between the cathode of one of said stages succeeding the first of said stages and said reference potential, said frequency responsive circuit presenting a relatively low impedance to the intermediate frequency of said video signals and a relatively high impedance to the lower frequencies of a noise pulse and a feedback circuit coupling only said lower frequencies of a noise pulse when a noise pulse is present in said video signals from said one stage to the cathode of another of said stages preceding said one stage to reduce the amplification of said noise pulse and thereby substantially reduce the undesired effects of noise pulses, said another of said stages including only a cathode resistor coupled between the cathode and said reference potential.

References Cited in the file of this patent

UNITED STATES PATENTS

| | | |
|---|---|---|
| 2,152,618 | Wheeler | Mar. 28, 1939 |
| 2,402,464 | Suter | June 18, 1946 |
| 2,538,488 | Volkers | Jan. 16, 1951 |
| 2,572,544 | Wallin | Oct. 23, 1951 |
| 2,802,068 | Harwood | Aug. 6, 1957 |

FOREIGN PATENTS

| | | |
|---|---|---|
| 880,603 | Germany | June 22, 1953 |

OTHER REFERENCES

Terman Text, Radio Engineering, third edition, pages 319 to 324, published 1947 by McGraw-Hill Book Co., Inc., New York.